Patented Apr. 28, 1936

2,038,994

UNITED STATES PATENT OFFICE 2,038,994

PEAT FERTILIZER

Oskar Flieg, Limburgerhof, Germany, assignor to I. G. Farbenindustrie Aktiengesellschaft, Frankfort-on-the-Main, Germany No Drawing. Application April 12, 1932, Serial No. 604,865. In Germany April 18, 1931

5 Claims. (Cl. 71—9)

The present invention relates to neutral peat fertilizers capable of being readily wetted.

As is well known, peat is greatly valued as an agent for improving the soil in agriculture, especially in horticulture. It should be brought into the soil in a thoroughly moistened state since otherwise so-called drying injuries take place. Furthermore the peat must be rendered sufficiently neutral in order to be converted rapidly into mild humus in the soil. Moistening and neutralization are ensured when before employment as a humus fertilizer the peat has passed through a stable and manure chamber. If this is not the case, as for example in horticulture where the peat is used directly from the bales, the thorough moistening is fairly difficult to effect because the peat is only capable of being wetted slowly. Peat which has been moistened with water alone drys again in the summer in the upper layers of the soil and then often remains dry until the autumn without imparting to the soil the finished condition which is characteristic for an active soil. It is usual therefore to compost the peat with an addition of water and calcium hydroxide or carbonate either alone or together with other organic substances and not to bring it into the soil until it has been stored for a long time.

I have now found that peat can be used directly as a humus fertilizer by adding an ammonium carbonate thereto. A mixture of air-dried peat with solid ammonium carbonate or ammonium bicarbonate will be thoroughly and quickly wetted, when water is sprayed thereon, a neutral, black crumbly mass being formed which homogeneously mixes with the soil. The amounts of an ammonium carbonate to be used vary as a rule between 7 and 12 per cent, by weight, of the peat. Thus an addition of from 9 to 12 per cent, preferably about 10 per cent, of ammonium bicarbonate to air-dried peat is very advantageous.

A soil to which has been added a thoroughly wetted mixture of air-dried peat and solid ammonium bicarbonate, said mixture containing 80 per cent of water, 0.46 per cent of ammonia nitrogen and 0.69 per cent of total nitrogen, is distinguished, as compared with a soil, to which has been added the same amount of unmixed peat or the corresponding amount of peat rendered neutral by means of calcium carbonate, by greater activity measured by the evolution of carbon dioxide per unit of time. Thus 100 grams of soil yield, when treated with 10 grams of untreated peat: 94.2 milligrams of $CO_2$; with 10 grams of peat with 10 per cent of $CaCO_3$: 235.4 milligrams of $CO_2$; with 10 grams of peat with 10 per cent of $NH_4HCO_3$: 362.7 milligrams of $CO_2$ per unit of time. In order to complete the fertilizing action, other fertilizing substances, such as phosphorus and potassium compounds, may be incorporated with the peat treated with the ammonium carbonate.

What I claim is:

1. A fertilizer essentially comprising air-dried peat and from 7 to 12 per cent by weight of the peat of a solid ammonium carbonate.

2. A fertilizer essentially comprising air-dried peat and from 9 to 12 per cent by weight of the peat of solid ammonium bicarbonate.

3. A fertilizer essentially comprising air-dried peat and about 10 per cent by weight of the peat of solid ammonium bicarbonate.

4. A fertilizer essentially comprising substantially dry peat and from 7 to 12 per cent by weight of the peat of a solid ammonium carbonate.

5. A fertilizer essentially comprising substantially dry peat and about 10 per cent by weight of the peat of solid ammonium bicarbonate.

OSKAR FLIEG.